(12) United States Patent
Zheng

(10) Patent No.: US 9,825,955 B2
(45) Date of Patent: Nov. 21, 2017

(54) METHOD AND SYSTEM FOR EXCHANGING INFORMATION

(71) Applicant: Alibaba Group Holding Limited, George Town (KY)

(72) Inventor: Yong Zheng, Hangzhou (CN)

(73) Assignee: Alibaba Group Holding Limited (KY)

( * ) Notice: Subject to any disclaimer, the term of this patent is extended or adjusted under 35 U.S.C. 154(b) by 240 days.

(21) Appl. No.: 14/834,822

(22) Filed: Aug. 25, 2015

(65) Prior Publication Data

US 2016/0065581 A1 Mar. 3, 2016

(30) Foreign Application Priority Data

Aug. 26, 2014 (CN) .......................... 2014 1 0426241

(51) Int. Cl.
| | | |
|---|---|---|
| *H04L 29/06* | (2006.01) | |
| *G06F 21/10* | (2013.01) | |
| *G06F 7/04* | (2006.01) | |
| *G06F 15/16* | (2006.01) | |
| *G06F 17/30* | (2006.01) | |

(52) U.S. Cl.
CPC .............. *H04L 63/10* (2013.01); *G06F 21/10* (2013.01)

(58) Field of Classification Search
None
See application file for complete search history.

(56) References Cited

U.S. PATENT DOCUMENTS

| | | | |
|---|---|---|---|
| 7,814,024 B2 | 10/2010 | Ching | |
| 8,971,800 B2 | 3/2015 | Hillan et al. | |
| 9,420,002 B1* | 8/2016 | McGovern | .............. H04L 63/10 |
| 2004/0024764 A1* | 2/2004 | Hsu | ......... G06F 21/31 |
| 2004/0030894 A1 | 2/2004 | Labrou et al. | |
| 2005/0102188 A1 | 5/2005 | Hutchison et al. | |
| 2006/0153073 A1* | 7/2006 | Ghiware | ............... H04W 12/08 |
| | | | 370/230 |
| 2007/0169180 A1* | 7/2007 | Guan | ...................... H04L 12/14 |
| | | | 726/4 |
| 2009/0144197 A1* | 6/2009 | Hurry | .................. G06Q 20/105 |
| | | | 705/41 |
| 2010/0024009 A1* | 1/2010 | Comay | ................... H04L 63/20 |
| | | | 726/4 |
| 2010/0280958 A1* | 11/2010 | Hasson | .................. G06Q 20/40 |
| | | | 705/75 |
| 2012/0276845 A1 | 11/2012 | Wikander | |
| 2012/0303831 A1* | 11/2012 | Toshniwal | .......... H04L 65/1016 |
| | | | 709/229 |
| 2012/0304252 A1* | 11/2012 | Boberg | ................... H04L 67/24 |
| | | | 726/1 |

(Continued)

*Primary Examiner* — Eric Chen
(74) *Attorney, Agent, or Firm* — Van Pelt, Yi & James LLP

(57) ABSTRACT

Exchanging information includes receiving an authorization request provided by a data request terminal, generating an authorization information updating instruction based on the authorization request, updating, based on the authorization information updating instruction, authorization information of the data request terminal that is stored on the request processing server, the authorization information indicating that the data request terminal has authorization request processing authority, and causing the data request terminal to acquire a data request result corresponding to data request information.

14 Claims, 7 Drawing Sheets

(56) References Cited

U.S. PATENT DOCUMENTS

| | | | |
|---|---|---|---|
| 2013/0085800 A1* | 4/2013 | Radkowski | G06Q 10/0635 705/7.28 |
| 2013/0226803 A1* | 8/2013 | Hsu | G06Q 20/351 705/44 |
| 2013/0283043 A1* | 10/2013 | Chen | H04L 63/0823 713/156 |
| 2014/0032409 A1* | 1/2014 | Rosano | G06Q 20/401 705/44 |
| 2014/0256250 A1 | 9/2014 | Cueto et al. | |
| 2014/0289831 A1* | 9/2014 | Prakash | H04L 9/3228 726/7 |
| 2015/0024710 A1* | 1/2015 | Becker | H04W 12/06 455/411 |
| 2015/0058220 A1* | 2/2015 | Cazanas | G06Q 20/40 705/44 |

\* cited by examiner

METHOD AND SYSTEM FOR EXCHANGING INFORMATION

CROSS REFERENCE TO OTHER APPLICATIONS

This application claims priority to People's Republic of China Patent Application No. 201410426241.2 entitled A PROCESSING METHOD, DEVICE, AND SYSTEM FOR EXCHANGING INFORMATION, filed Aug. 26, 2014 which is incorporated herein by reference for all purposes.

FIELD OF THE INVENTION

The present application relates to a method and system for exchanging information.

BACKGROUND

As the trend towards three-network convergence increases, exchange process authorization functions have been applied to increase data exchange security between various terminals of the Internet. For example, a user logs onto a terminal and completes an online payment using payment software of the terminal. In the above process, the fact that banking systems have high security requirements for payment software programs and have definite access mechanisms hinders third party developers from developing programs for payment functions and value-added services. Using value-added services such as Internet television terminal-based games, audiovisual works on demand, and the e-commerce of new media platforms as examples, payment application programs (e.g., pay-per-view and television shopping) that can be run on television terminals are increasing in number on a daily basis. However, application program-based payment functions typically lack a payment link to banking servers, thus affecting the development and use of these services and programs. Increasing convenience, security, and extensibility of application program payment functions for Internet terminals should be addressed.

Using the Internet television terminal as an example, conventional television payment approaches are as follows:

In a first approach, an electronic wallet-based payment technique is provided. Users register with an operator and fill their electronic wallets by prepaying, and use their prepaid accounts to purchase content. The first approach is typically used with services such as video on demand that are provided by the operator.

In a second approach, a bank card-based payment technique is provided. Through remote control input or by swiping a card at a point of service (POS) machine, a user transmits transaction information and banking card-related information to a banking system to complete a transaction, or the user signs a contract with a bank and thereby binds user information and a television (or a set-top box) terminal information to the banking card. When the transaction occurs, entering the banking card information is not needed. Submission of the user information and terminal information is sufficient.

An analysis of the above two conventional approaches shows that the payment methods involve very high operating costs for the user and rely on the use of television terminal control equipment (e.g., remote control). The user's bank card number, name, identification number, payment code, and other such information need to be input, via the television terminal control equipment such as a remote control, on a television which allows only up, down, left and right operations. Therefore, current payment approaches cannot provide users with a satisfactory experience while being convenient and secure.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
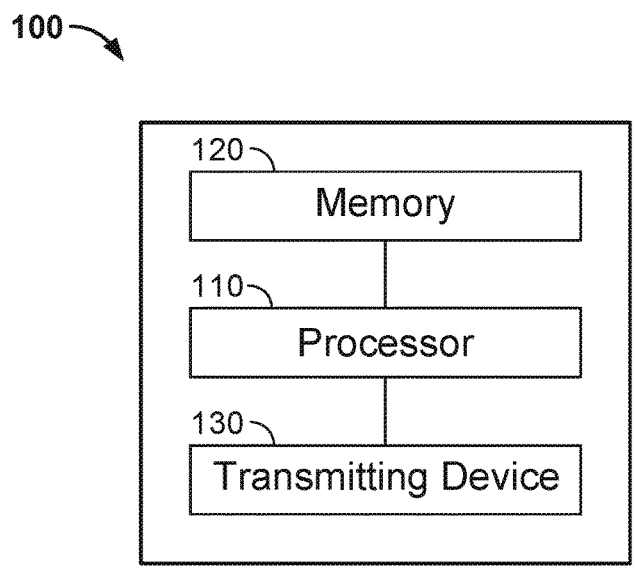
FIG. 1 is a hardware structural diagram of an embodiment of a television terminal for exchanging information.

FIG. 1 is a hardware structural diagram of an embodiment of a television terminal for exchanging information. In some embodiments, the television terminal 100 corresponds to the payment terminal 410 of FIG. 4 and comprises: one or more processors 110, a memory 120, and a transmitting device 130.

Figure 2A:
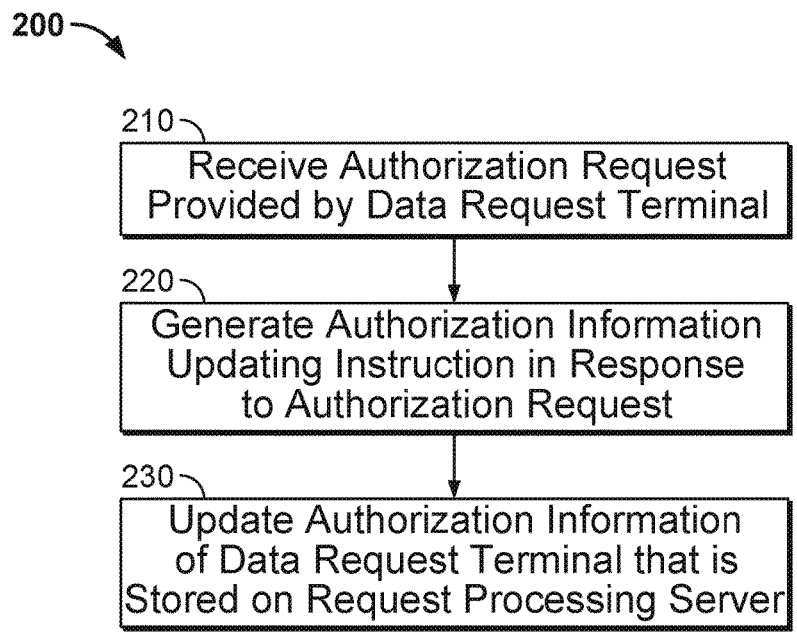
FIG. 2A is a flowchart of an embodiment of a process for exchanging information.

In some embodiments, the process 200 of FIG. 2A is implemented on the television terminal 100, a mobile terminal, a computer terminal, or similar operating device.

In some embodiments, the one or more (only one processor is shown in FIG. 1) processors 110 include but are not limited to processing devices such as microprocessor MCUs or programmable logic device FPGAs.

In some embodiments, the memory 120 is configured to store data.

In some embodiments, the transmitting device 130 is configured to perform communication functions.

One of ordinary skill in the art can understand that the structures shown in FIG. 1 are merely schematic and do not limit the structures of the above electronic device. For example, the television terminal 100 includes more or fewer components than shown in FIG. 1 or has a configuration different from the configuration shown in FIG. 1.

The memory 120 can be used to store application programs and modules of the application software, e.g., a program instruction/module corresponding to an anti-virus application program. By running software programs and modules stored in the memory 120, the processor 110 executes various function applications and data processing, i.e., implements a technique for upgrading the application software. The memory 120 can include high-speed random access memory. The memory can further include non-volatile memory, such as one or more magnetic storage devices, flash memory, or other non-volatile solid-state memory. In some embodiments, the memory 120 can further include memory that is remotely disposed relative to the processor 110. Such remote memory can be connected to the television terminal 100 via a network. Examples of the network include but are not limited to the Internet, corporate intranets, local area networks, virtual private networks, mobile communication networks, or any combination thereof.

In some embodiments, the transmitting device 130 is configured to send and/or receive data via a network. Examples of the network include wired or wireless networks provided by communication suppliers for the television terminal 100. In some embodiments, the transmitting device 130 includes a network interface controller (NIC), which can connect to other networks via a base station and thus communicate with the Internet. For example, the transmitting device 130 corresponds to a radio frequency (RF) module, which is configured to communicate with the Internet wirelessly.

FIG. 2A is a flowchart of an embodiment of a process for exchanging information. In some embodiments, the process 200 is implemented by a system 400 of FIG. 4. Process 200 can be applied when a terminal executes customized information. This customized information may be order information generated from shopping information customized by a user on the terminal. The system 400 includes a data request terminal 410, a request processing server 420, and a third party authorization terminal 430.

In 210, the third party authorization terminal receives an authorization request provided by a data request terminal.

The third party authorization terminal can be a mobile terminal, and the data request terminal can be a payment terminal that provides payment for locally generated order form information. The third party authorization terminal can establish a near-field communication (NFC) channel with the data request terminal to an NFC device and thus quickly and conveniently acquire a data request terminal identifier from the data request terminal.

For example, the third party authorization terminal corresponds to a mobile terminal including an NFC component, and the payment terminal corresponds to a television terminal including an NFC component. As used herein, the NFC component refers to a circuitry comprising an antenna and employing electromagnetic induction for detecting the presence of another NFC component that is in close proximity according to standards such as Near Field Communication Interface and Protocol-1 (NFCIP-1), Near Field Communication Interface and Protocol-2 (NFCIP-2), etc. The above mobile terminal with an NFC component communicates in a NFC peer-to-peer (P2P) mode. For example, the NFC peer-to-peer (P2P) mode is performed over a radio frequency (RF) band. For example, an employee of a company uses an access card including an NFC component to check into work via the brushing of the access card against a sensor. For example, after making short-distance contact with the television terminal and establishing a communication channel according to an appropriate NFC protocol, the mobile terminal can acquire order form information relating to television terminal payment (e.g., order information relating to a payment made by a user selecting a pay-per-view or other on screen purchase option via the television terminal) and acquire television terminal equipment information. In some embodiments, the equipment information includes a payment terminal identifier.

In 220, the third party authorization terminal generates an authorization information updating instruction in response to the authorization request. In some embodiments, the authorization information updating instruction is generated by displaying an input user interface (which can be a standalone application executing on the third party authorization terminal, or obtained as a webpage from the request processing server and rendered in a browser), prompting the user to enter payment related information via the user interface, and forming the authorization information updating instruction based on user inputs. In various embodiments, the authorization information updating instruction can be a code, a string, or any other appropriate formats. For example, the authorization information updating instruction corresponds to a code, a string, or any other appropriate formats. The format of the updating instruction can be pre-defined such as, for example, a randomly generated 6 digit string.

In 230, the third party authorization terminal updates authorization information of the data request terminal that is stored on a storage accessible by the request processing server to indicate that the data request terminal has authorization request processing authority based on the updating instruction, and causes the data request terminal to acquire a data request result corresponding to data request information. The indication can be represented using a pre-specified code, a string, or any other appropriate format. The request processing server can be a server operated by a service provider.

In some embodiments, the authorization information updating instruction in operation 230 further includes the data request terminal identifier of the data request terminal. Thus, the third party authorization terminal can update the authorization information of the data request terminal stored on a storage accessible by the request processing server to indicate that the data request terminal has authorization request processing authority by looking up the data request terminal identifier in a table and updating the corresponding authorization request processing authority entry.

In some embodiments, the updating of the authorization information of the data request terminal includes: the third party authorization terminal acquires, from a request processing server, a data request terminal matching the data request terminal identifier, fetches the authorization information already stored on the data request terminal, and updates the authorization information already stored on the data request terminal to indicate that the data request terminal has authorization request processing authority.

As shown above, the process 200 performs authorization request processing and authority authorization for the data request terminal via the third party authorization terminal. After the third party authorization terminal acquires a data request terminal identifier, the third party authorization terminal sends an authorization information updating request to a request processing server. Then, the third party authorization terminal looks up the current data request terminal authorization information that is already stored on the request processing server based on a data request terminal identifier included in the authorization information updating instruction and updates the authorization information to indicate that the data request terminal has authorization request processing authority. In this process, the third party authorization terminal updates the authorization information of the data request terminal to indicate that the data request terminal has authorization request processing authority, and sends a signal to the data request terminal that triggers (causes) the data request terminal to acquire the data request result corresponding to the data request information. After the data request terminal acquires the data request result, when the data request terminal next accesses the request processing server, the data request terminal is not required to use other equipment to complete the data processing, but can directly complete the data processing and thus reduce the time and complexity of performing data processing requests provided by Internet terminals.

Assume, as an example, that the payment terminal corresponds to a television terminal including an NFC component. In one scheme, the one scheme can be applied to a payment terminal that has not stored authorization information on a payment server, or has stored authorization information lacking payment authority on a payment server. Therefore, before the third party authorization terminal authorizes the payment terminal, the payment terminal already has accessed the payment server, but has failed to acquire payment authority. Therefore, the one scheme can provide the payment terminal with payment authority through a third party authorization terminal. As an example, the third party authorization terminal accesses the payment server, and the stored current authorization information of the payment terminal indicates that the payment terminal has payment authority.

Thus, the example using a third party authorization terminal, which is a mobile terminal including an NFC component, and a payment terminal, which is a television terminal including an NFC component, illustrates the second scheme corresponding to an NFC component-based television authorization payment process, which, in combination with NFC and the mobile terminal, implements television authorized payment. As a result, television payments become more convenient and faster. Thus, the principle of multiple uses for a single authorization is implemented, and user satisfaction of the payment experience is increased.

Figure 2B:
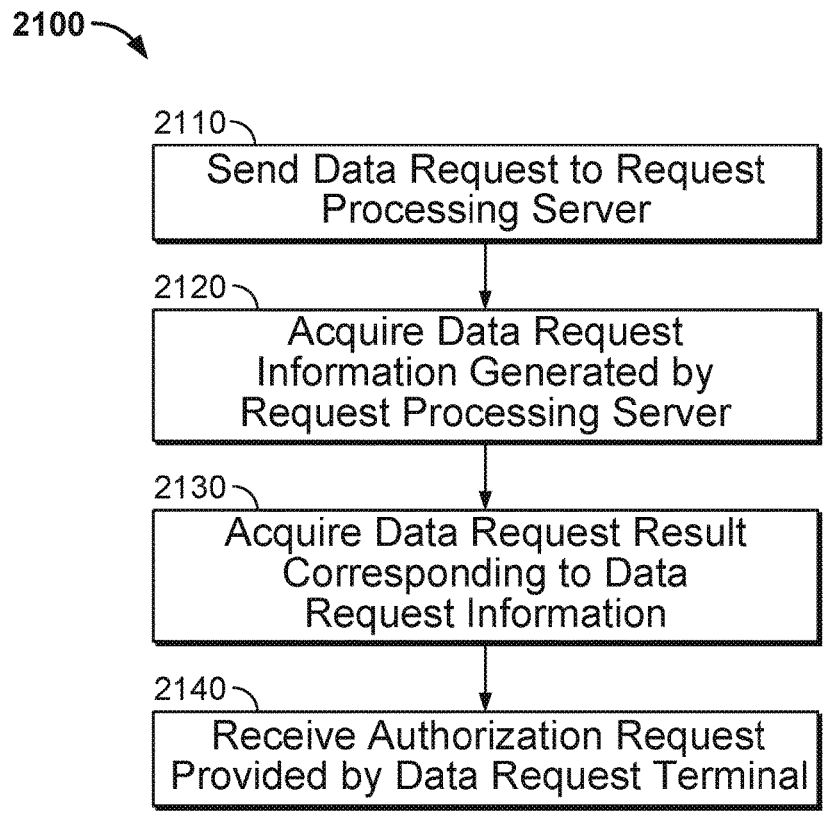
FIG. 2B is a flowchart of an embodiment of a process for receiving an authorization request.

FIG. 2B is a flowchart of an embodiment of a process for receiving an authorization request. In some embodiments, the process 2100 is an implementation of operation 210 of FIG. 2A and comprises:

In 2110, the data request terminal sends a data request to the request processing server.

Continuing with the example of the third party terminal being a mobile terminal and the data request terminal being a payment terminal that provides a payment function for locally generated order form information, the data request in operation 2110 can be an order request. This order request can include order information. The order information can be information entered by a user and received by a user interface provided by the payment terminal, or can be product information displayed in a browser and fetched through the payment terminal. The order information can include product, account number, amount, or any combination thereof. The manner in which the order information and order request are acquired here is not limited to how they are described above.

Using a payment terminal that corresponds to a television terminal as an example, after the television terminal user confirms that he or she has placed an order for a current product, the television terminal generates an order request and requests that the order request be sent to the payment server.

In 2120, the data request terminal acquires the data request information generated by the request processing server based on customized information in the data request and authorization information of the data request terminal.

The request processing server can be a payment server that generates transaction results upon completing payment transactions. Continuing with the example of the third party authorization terminal which is a mobile terminal and a data request terminal which is a payment terminal that provides payment functions for locally generated order form information, the payment server in operation 2120 can generate corresponding payment order forms in real time based on the received order information. Moreover, the payment server can send order information and authorization information indicating whether the payment terminal has payment authority back to the payment terminal. In some embodiments, the order form information includes request serial number, product, amount, account number, source, time, and/or any other appropriate information pertaining to the order.

Figure 4:
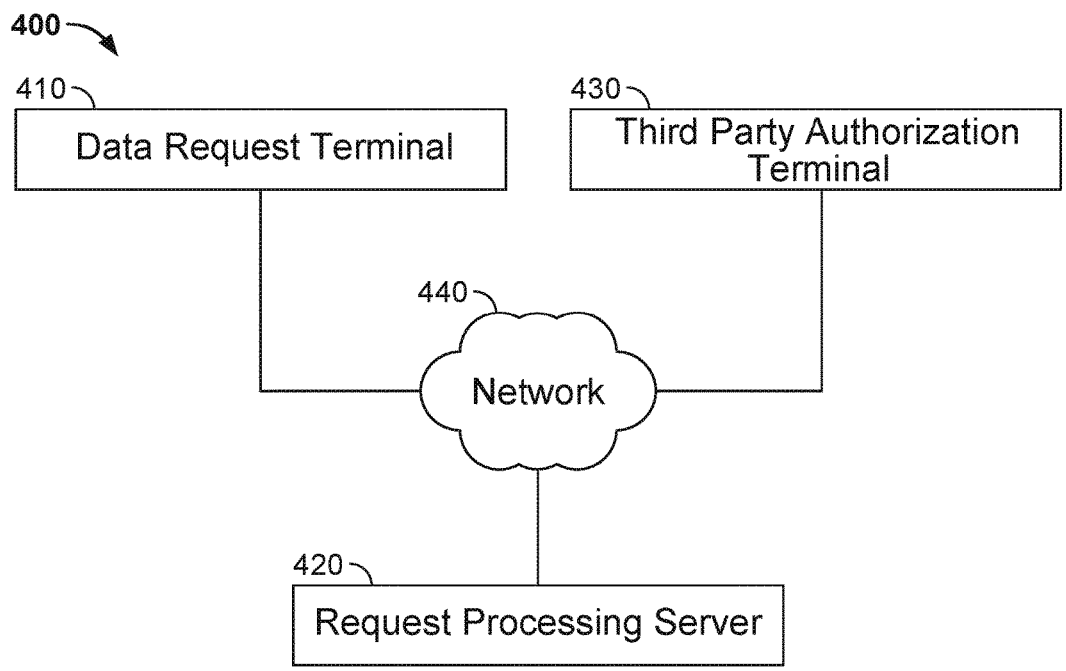
FIG. 4 is a structural diagram of an embodiment of a system for exchanging information.

Referring to FIG. 4, continuing with the example of the data request terminal which is a television terminal, payment authority of each television terminal is stored in a storage accessible by the payment server. In some embodiments, the payment server uses the recorded payment terminal identifier of the television terminal and its corresponding authorization information to indicate the payment authority of the television terminal. In some embodiments, the payment terminal identifier is a unique identifier indicating a certain television terminal. The payment terminal identifier can be computed based on a random identifier generation algorithm from at least one piece of data such as a payment terminal equipment number, a MAC address, or system hardware information. A unique identifier can be thereby defined to confirm that the payment terminal corresponds to the equipment. The payment authority authorization information is used for authorizing the unique identifier. A corresponding value can be written corresponding to this unique identifier to indicate whether the television terminal has payment authority. When the authorization information corresponding to this unique identifier indicates that the television terminal has payment authority, the payment authority further indicates that the television terminal that has this unique identifier has already been successfully authorized.

In 2130, if the authorization information indicates that the data request terminal has authorization request processing authority, the data request terminal acquires the data request result corresponding to the data request information based on the authorization information.

In this example, it is assumed that the third party authorization terminal corresponds to a mobile terminal, and the data request terminal corresponds to a payment terminal having a function of providing payment for locally generated order information such as a television terminal. The request processing server could be a payment server which generates transaction results upon completing payment transactions. The authorization information can include a unique identifier of a payment terminal, an authorized payment account number, a presence/absence of an authorization identifier, or any combination thereof.

In 2140, if the authorization information indicates that the data request terminal does not have authorization request processing authority, the third party authorization terminal receives the authorization request provided by the data request terminal. In other words, the authorization information of the data request terminal is updated via the third party authorization terminal to indicate that the data request terminal has authorization request processing authority and to cause the data request terminal to acquire the data request result corresponding to the data request information.

The third party authorization terminal in the operation 2140 can be a mobile terminal for performing the authorization process in relation to authorization request processing authority on behalf of the data request terminal. In some embodiments, the third party authorization terminal and the data request terminal can establish a communication link via NFC component interfaces such as RF interfaces.

In some embodiments, the acquiring of the data request result operations corresponding to the data request information in operations 2130 and 2140 can be implemented as follows: the data request terminal sends a payment request to a request processing server. The payment request can include the data request terminal identifier of a data request terminal. The data request terminal receives a data request result generated by the request processing server based on the data request information. In some embodiments, after the request processing server looks up the authorization information matching the data request terminal identifier, the request processing server completes the data request processing and generates a data request result based on the data request information of the data request terminal.

In this example, a third party authorization terminal can be a mobile terminal, a data request terminal can be a payment terminal providing a payment function for locally generated order form information, and a request processing server can be a payment server that generates transaction results upon completion of payment transactions, the process whereby the above payment server completes data request processing based on order form information of the payment terminal can be used for subjecting the transaction payment request to payment processing. As an example, the payment can be completed by requesting a payment gateway. This payment gateway can be: a bank payment gateway or a third party payment platform. The payment server supports bank card payments, prepaid card payments, or third party payments.

Thus, in the some embodiments, if a third party authorization terminal that is a mobile terminal is used, a data request terminal is a payment terminal providing a payment for locally generated order form information, and a request processing server is a payment server that generates transaction results upon the completion of payment transactions, by providing the payment terminal with a payment server used to complete payment processes, the following process can be performed: the payment server sends an order request to the payment server; the payment server is to acquire payment results based on the order form information generated from the order information in the order request and the authorization information of the payment terminal. The authorization information is used to indicate whether the payment terminal has payment authority. In some embodiments, once the authorization information indicates that the payment terminal has payment authority, the payment terminal can acquire the payment result corresponding to the order form information based on the authorization information. In cases where the authorization information indicates that the payment terminal does not have payment authority, the authorization information of the payment terminal can be updated via a third party authorization terminal to indicate that the payment terminal has payment authority, and the payment terminal is sent the payment result corresponding to the order form information.

The above payment process does not require the user to perform additional registration or to input his or her bank/credit card number, name, identification card number, payment code, etc. at the payment terminal. Also, the above payment process does not require the user to perform an operation such as scanning a QR code. The above payment process therefore streamlines the user's operating process, reduces operating costs, reduces the complexity of data processing requests provided by Internet terminals, and thus provides a convenient and secure operating experience to payment terminal users. Furthermore, when no payment authority exists at the payment terminal, the system completes payment authorization through third party equipment. Thus, the next time the payment terminal accesses the payment server, the payment terminal does not need to use other equipment again, but can directly complete the payment process.

Using as an example a payment terminal which is a television terminal in the process whereby the user uses a television to purchase merchandise and make payments, the conventional payment process is costly in terms of user operations. The user's bank card number, name, identification number, payment code, and other such information is to be input on a television using a remote control which often allows only up, down, left, and right operations. Therefore, the operating procedure of the conventional payment method is not user-friendly. Instead, the above process 200 provides users with a more convenient and secure method of payment.

In some embodiments, in order to increase the security of payment authorization, a payment count threshold value can be set. The payment server records the number of times each payment terminal accesses the payment server to acquire payment authority. In other words, the payment server records the number of payments made by the payment terminal. When the number of times that the payment terminal acquires payment authority (i.e., the number of times that payment is executed) within a preset period of time exceeds the payment count threshold value, the payment server automatically modifies the payment terminal's authorization information to indicate that the payment terminal does not have payment authority to require a third party to again perform payment authorization.

Figure 2C:
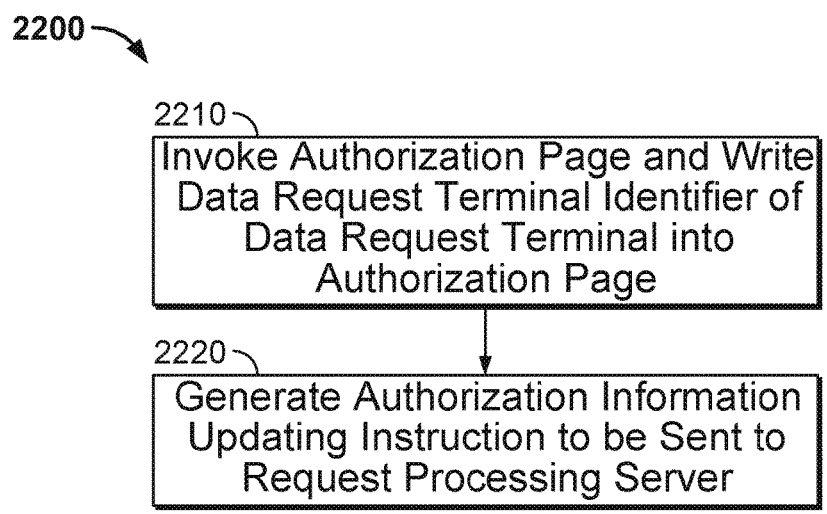
FIG. 2C is a flowchart of an embodiment of a process for generating an authorization information updating instruction.

FIG. 2C is a flowchart of an embodiment of a process for generating an authorization information updating instruction. In some embodiments, the process 2200 is an implementation of operation 220 of FIG. 2A and comprises:

In 2210, the third party authorization terminal invokes an authorization page and writes the data request terminal identifier of the data request terminal into the authorization page. Using a third party authorization terminal which is a mobile terminal that has an NFC component installed as an example, the mobile terminal can display order form information and the authorization page for requesting payment. In some embodiments, the order form information and authorization page are provided by a standalone application executing on the third party authorization terminal. In some embodiments, the order form information and the authorization page are retrieved (e.g., using hypertext transfer protocol (HTTP)) from a server such as the request processing server and rendered in a browser executing on the third party authorization terminal.

In 2220, after the authorization page invoked by the third party authorization terminal receives the authorization information updating instruction, the third party authorization terminal generates the authorization information updating instruction to be sent to the request processing server.

Continuing to use a third party authorization terminal which is a mobile terminal that has a field communication (NFC) device installed, a data request terminal which is a payment terminal providing a payment for locally generated order form information, and a request processing server which is a payment server that generates transaction results upon completion of payment transactions as an example, in operation 2220, an authorization control can be set up on the authorization page of the mobile terminal. After the authorization control is activated by the user (e.g., through clicking or selecting), the mobile terminal generates an authorization information updating instruction. At this point, the mobile terminal sends to the payment server an authorization information updating instruction indicating that payment authorization is to be performed for the mobile terminal. The payment authorization indicates that the mobile terminal device has payment authorization and is to be able to conduct payments without requiring a password. After the payment authorization is successful, the television terminal sends a payment request to the payment server to complete the payment process.

In some embodiments, after operation 2210 is performed, i.e., after the third party authorization terminal invokes the authorization page, the request serial number of the data request terminal can be used to display the data request information of the data request terminal on the authorization page. The displaying of the data request information of the data request terminal can be implemented through the scheme below:

First, the third party authorization terminal extracts the request serial number of the data request terminal from the authorization request provided by the data request terminal.

Second, the third party authorization terminal sends the extracted request serial number of the data request terminal to the request processing server.

Third, the third party authorization terminal receives data request information sent back by the request processing server. In some embodiments, the request processing server looks up the data request information corresponding to the request serial number based on the received request serial number.

Finally, the third party authorization terminal displays the data request information on the authorization page.

Referring to FIG. 4, a third party authorization terminal is a mobile terminal, a data request terminal is a payment terminal providing a payment for locally generated order form information, and a request processing server is a payment server that generates transaction results upon completion of payment transactions, and the request serial number is an order form number. The television terminal provides a payment radio-frequency field through an NFC component. With the above technique, the television terminal encodes the payment request and outputs the payment request via the television terminal's NFC component using a payment radio frequency field (e.g., via a transmitter for transmitting RF signals). To conserve resources, the payment result can include an order form number. Other order form information can be acquired by making a request to the payment server that includes the order form number, causing the payment server to look up other information in a database indexed by order form numbers using the order form number and send the order form number to the requester.

In process 200, payment authorization of the payment terminal is performed by a third party authorization terminal resulting in a payment process of the payment terminal that is convenient and fast. By relying on multiple uses for a single authorization, user satisfaction of the payment experience can be increased.

Figure 3A:
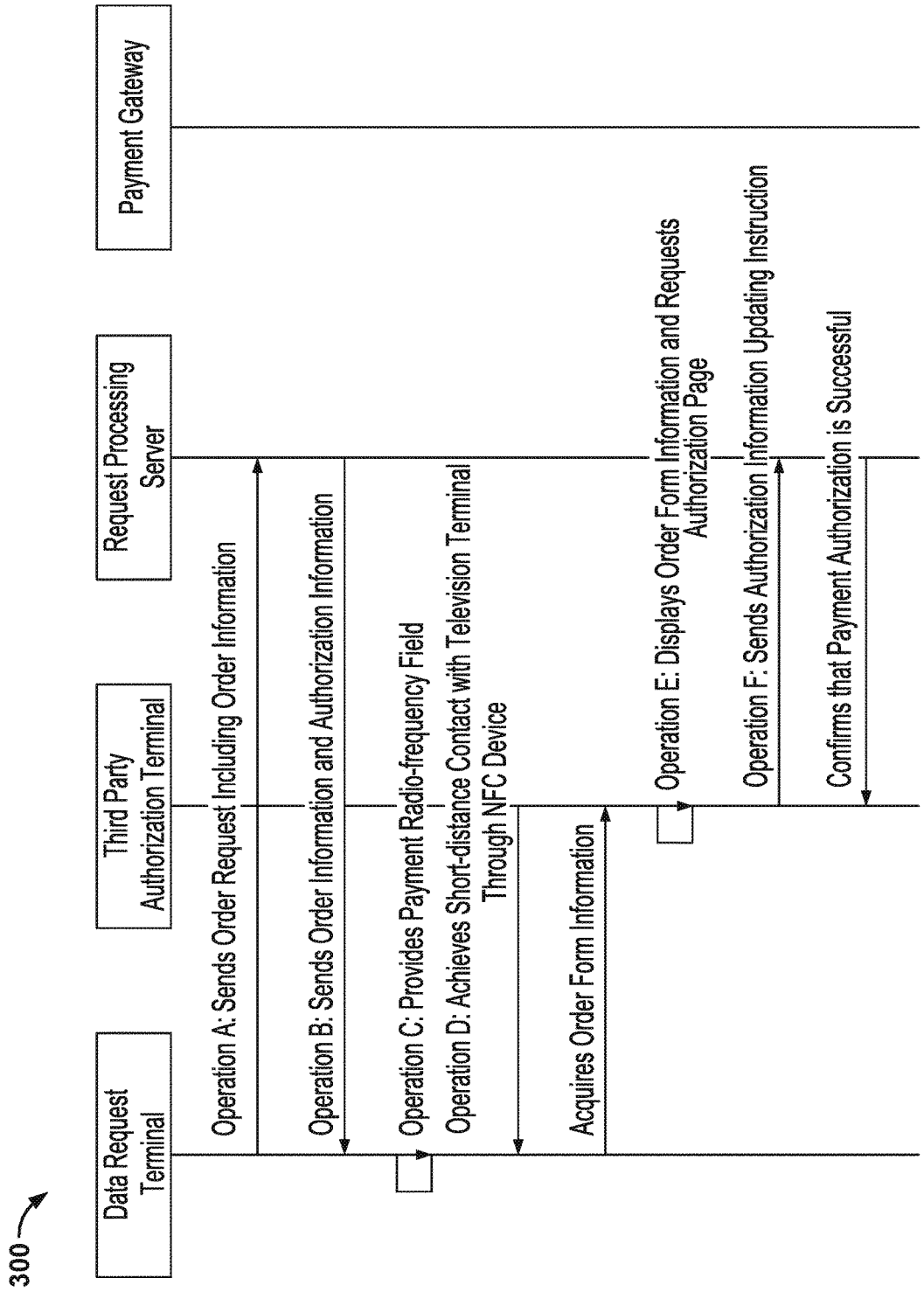
FIGS. 3A and 3B are detailed flowcharts of an embodiment of a process for exchanging information.
Figure 3B:
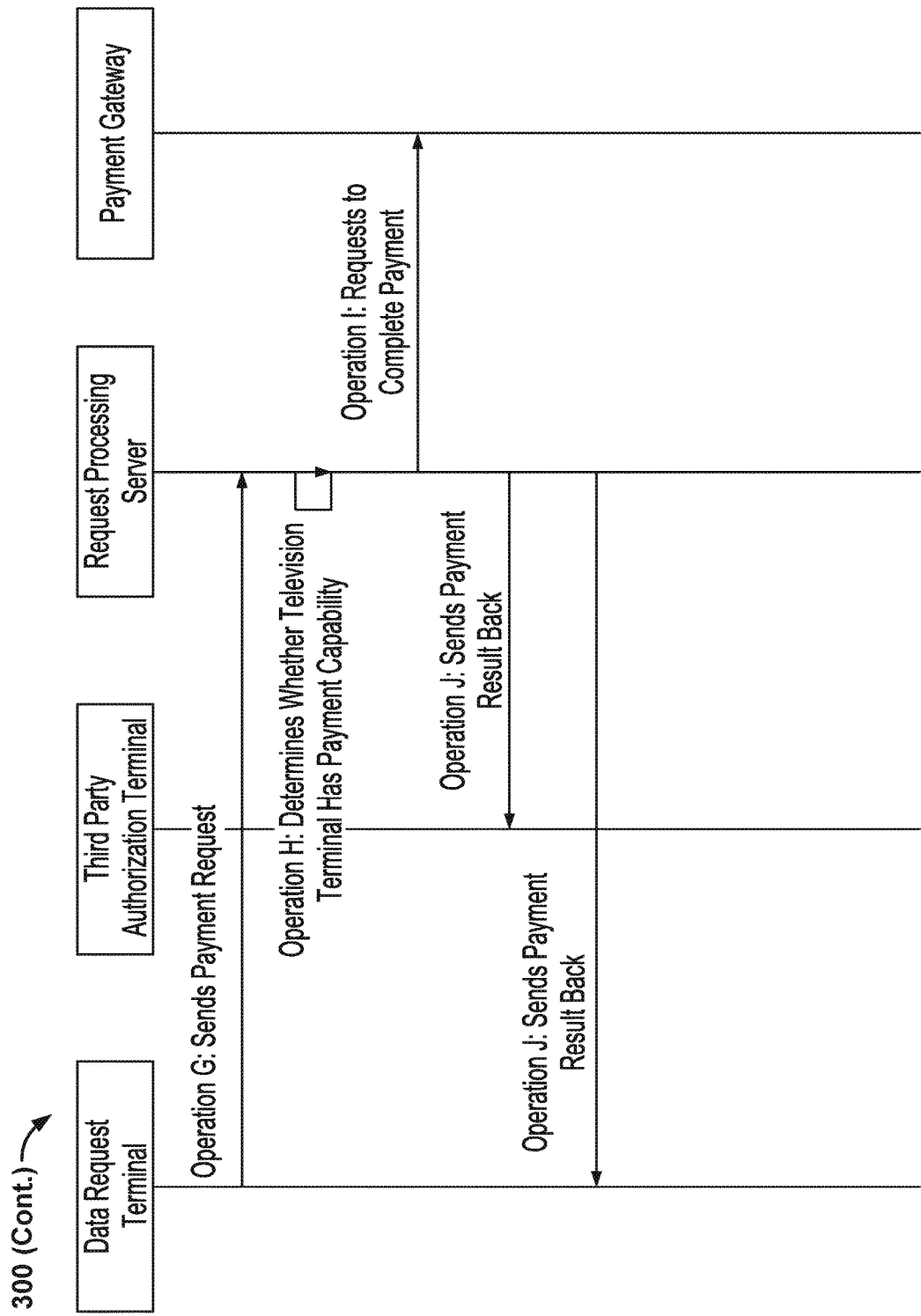

Using as an example a payment terminal which is a television terminal comprising an NFC component and a third party authorization terminal comprising an NFC component, the embodiments shown in the FIGS. 1 and 2A are illustrated in FIGS. 3A and 3B. FIGS. 3A and 3B are detailed flowcharts of an embodiment of a process for exchanging information. In some embodiments, the process 300 is performed in system 400 of FIG. 4 and comprises:

In operation A, a data request terminal (in this case, a television terminal) with an NFC module sends an order request including order information to a request processing server (in this case, a payment server). The order information can include: product, account number, amount, etc.

In operation B, in response to the order request, the payment server generates a corresponding payment order form based on the order information, and sends the order information and authorization information including whether the television terminal has payment authority back to the television terminal. The order form information can include order form number, product, amount, account number, source, time, etc.

In this example, the payment server maintains a record list including the television terminal identifier and authorization information to store the payment authority of the television terminal. In some embodiments, the television terminal identifier is randomly computed based on an algorithm from at least one piece of data such as a television terminal equipment number, a media access control (MAC) address, or system hardware information, and/or any other unique identifier for the equipment. The payment authority authorization information is for authorizing the equipment corresponding to the unique identifier. When the authorization information is validated, that means that this equipment has payment authorization.

If the authorization information sent back by the payment server indicates that the television terminal has been payment-authorized, i.e., that the authorization information indicates that the television terminal has payment authority, then control is passed to operation G. In this case, the mobile terminal equipment is not needed to perform payment authorization.

If the authorization information sent back by the payment server indicates that the television terminal has not been payment-authorized, i.e., that the authorization information indicates that the television terminal does not have payment authority, then control is passed to operation C.

In operation C, the television terminal provides a payment radio-frequency field through the NFC component. The "payment radio-frequency field" refers to the television terminal outputting payment requests via the NFC component. The payment request can include an order form number. The order form information is acquired from the payment server based on the order form number.

In operation D, through short-distance contact by the NFC component with the television terminal, the mobile terminal with the NFC component acquires the order form information and the television terminal identifier from the television terminal.

In operation E, the mobile terminal displays the order form information and requests a payment authorization page. Operation E can invoke the authorization page in a standalone application or in a browser, and the order form information can be displayed on the authorization page.

In operation F, after the authorization page of the mobile terminal receives an authorization request, the mobile terminal sends an authorization information updating instruction to the payment server. The television terminal authorization information recorded on the payment server is updated to indicate that the television terminal has payment authority, and as a result, the television terminal acquires payment authorization. Payment authorization indicates that the piece of equipment, the television terminal, has payment authorization. Afterwards, the television terminal is to be able to make payment without requiring a password.

In operation G, after the television terminal successfully acquires the payment authorization, the television terminal sends a payment request to the payment server.

In operation H, after the payment server receives the payment request, the payment server determines whether the television terminal has been authorized by the mobile terminal to have payment authority. In other words, the payment server checks the locally stored television terminal authorization information to determine whether the television terminal has payment authority. If the television terminal authorization information indicates that the television terminal has payment authority, this means that the television terminal has already communicated with the mobile terminal and established its payment authority.

In operation I, after the payment server determines that the television terminal has payment authority for the owner of the mobile device to make a payment, the payment gateway is requested to complete payment, thus causing the payment server to complete the payment process for the television terminal's order information and to obtain a payment result.

In operation J, after receiving the payment result generated by the payment gateway, the payment server sends the payment result back to the mobile terminal, the television terminal, or a combination thereof.

In some embodiments, the determining of whether the television terminal has already been granted payment authority by the owner of the mobile device is as follows: the payment server determines whether the mobile terminal identifier or account number corresponding to the authorization information (the authorized account number) of the payment terminal is consistent with the mobile terminal identifier or account number used by the current payment request. If the mobile terminal identifier or account number corresponding to the authorization information (the authorized account number) of the payment terminal is consistent with the mobile terminal identifier or account number used by the current payment request, the payment server determines that the current television terminal has payment authority.

Based on the process 300, the payment gateway can be a bank payment gateway or a third party payment platform. The payment server supports bank card payments, prepaid card payments, third party payments, or any combination thereof.

The payment gateway can be a background server used to provide payment services and to complete the payment process.

The device with near-field communication (NFC) is not limited to the television terminal as shown in FIGS. 3A and 3B. The device with NFC can also be a computer terminal or a smartphone (such as an Android phone or an iOS phone), a tablet computer such as an iPad, a palmtop computer, a mobile Internet device (MID), or any other appropriate client device.

FIG. 4 is a structural diagram of an embodiment of a system for exchanging information. In some embodiments, the system 400 is configured to implement process 200 of FIG. 2A or process 300 of FIGS. 3A and 3B and comprises: a data request terminal or payment terminal 410, a request processing server 420, and a third party authorization terminal 430.

In this example, data request terminal 410 and third party authorization terminal 430 can communicate directly via an NFC channel. The terminals are configured to communicate with the request processing server 420 via a network 440, such as the Internet, a private network, a wireless network, or any other appropriate network and/or combination thereof.

In some embodiments, the data request terminal 410 is configured to provide an authorization request.

In some embodiments, the third party authorization terminal 430 is configured to establish separate communication relationships with the request processing server 420 and the data request terminal 410, send an authorization information updating instruction to the request processing server based on the authorization request, and update, based on the updating instruction, the authorization information of the data request terminal that is stored on the request processing server to the data request terminal having authorization request processing authority to cause the request terminal to acquire the data request result corresponding to the data request information.

In some embodiments, the data request terminal is further configured to send a data request to the request processing server and acquire data request information generated by the request processing server based on customized information in the data request and acquire the authorization information of the data request terminal. If the authorization information corresponding to the data request terminal indicates that the data request terminal has authorization request processing authority, the data request terminal acquires the data request result corresponding to the data request information based on the authorization information. If the authorization information corresponds to the data request terminal not having the authorization request processing authority, the authorization information of the data request terminal is updated via the third party authorization terminal to the data request terminal having the authorization request processing authority causing the data request terminal to acquire the data request result corresponding to the data request information.

Continuing with the examples of the third party terminal being a mobile terminal and the data request terminal being a payment terminal that provides a payment function for locally generated order form information, the data request can be an order request. The order request can include order information. The order information can be information entered by a user and received by a user interface provided by the payment terminal, or the order information can be product information displayed in a browser and fetched through the payment terminal. The order information can include product, account number, amount, etc.

Using a payment terminal corresponding to a television terminal as an example, after the television terminal user confirms that he or she has placed an order for the current product, the television terminal generates an order request and requests that the order request be sent to the payment server.

Continuing with the example of the payment terminal corresponding to the television terminal, the payment authority of each television terminal is stored in the payment server. The payment server can indicate the payment authority of the television terminal based on the recorded payment terminal identifier of the television terminal and corresponding authorization information of the television terminal. In some embodiments, the payment terminal identifier is a unique identifier indicating a specific television terminal. In some embodiments, the payment terminal identifier is randomly computed according to an algorithm from at least one piece of data such as the payment terminal equipment number, a MAC address, or system hardware information, and a unique identifier can be thereby defined to confirm that the payment terminal is the equipment. The payment authority authorization information is for authorizing the equipment corresponding to the unique identifier. A corresponding value can be written corresponding to this unique identifier to indicate whether the television terminal has payment authority. When the authorization information corresponding to the unique identifier indicates that the television terminal has payment authority, the authorization information indicates that the television terminal that has this unique identifier has already been successfully authorized and this television terminal equipment has payment authority.

Please note that the third party authorization terminal can be a mobile terminal for performing the authorization process in relation to payment authority on behalf of the payment terminal. In some embodiments, the third party authorization terminal and the payment terminal can establish a communication link by NFC components.

In some embodiments, the operations whereby the data request terminal acquires the data request result corresponding to the data request information can be implemented as follows: the data request terminal sends a payment request to a request processing server. The payment request can include: the data request terminal identifier of a data request terminal. The data request terminal receives a data request result generated by the request processing server based on the data request information. In some embodiments, after the request processing server looks up the authorization information matching the data request terminal identifier, the request processing server completes the data request processing and generates a data request result based on the data request information of the data request terminal.

Continuing to use as an example the third party authorization terminal which can be the mobile terminal, a data request terminal which is a payment terminal providing a payment function for locally generated order form information, and a request processing server which can be a payment server that generates transaction results upon completion of payment transactions, the process whereby the above payment server completes data request processing based on order form information of the payment terminal can be a process for subjecting the transaction payment request to payment processing. In some embodiments, the payment can be completed by requesting a payment gateway. The payment gateway can be a bank payment gateway or a third party payment platform. The payment server supports bank card payments, prepaid card payments, or third party payments.

Through the scheme performed by the system 400, by providing the payment terminal with a payment server for completing payment, the system 400 implements the following process: the payment terminal sends an order request to the payment server. The payment server acquires payment results based on the order form information generated from the order information in the order request and the authorization information of the payment terminal. The authorization information is used to indicate whether the payment terminal has payment authority. In some embodiments, once the content stored in the authorization information indicates that the payment terminal has payment authority, the payment terminal can acquire the payment result corresponding to the order form information based on the authorization information. In cases where the content stored in the authorization information corresponds to the payment terminal not having payment authority, the authorization information of the payment terminal can be updated via a third party authorization terminal to the payment terminal having the payment authority, with the result that the payment terminal acquires the payment result corresponding to the order form information.

The above payment process does not require the user to additionally perform operator registration or to input his or her bank card number, name, identification card number, or payment code or to perform other such operations at the payment terminal. Nor does the above payment process require the user to perform an operation such as scanning a QR code. The above payment process therefore streamlines the user's operating process, reduces operating costs, and reduces the complexity of data processing requests provided by Internet terminals, thus providing a more convenient and more secure operating experience to payment terminal users. Furthermore, when no payment authority at the payment terminal exists, the system completes payment authorization through third party equipment. Thus, the next time the payment terminal accesses the payment server, the payment terminal does not need to use other equipment again, but can directly complete the payment process.

Using as an example a payment terminal which is a television terminal, in the process where the user uses a television to purchase merchandise and make payments, the conventional payment process requires a very high cost in terms of user operations. The user's bank card number, name, identification number, payment code, and other such information are required to be input on the television which allows only up, down, left, and right operations. Therefore, the operating procedure of the conventional payment process is bothersome and provides little satisfaction for users. On the other hand, the above system 400 provides users with a more convenient and secure method of payment.

Figure 5:
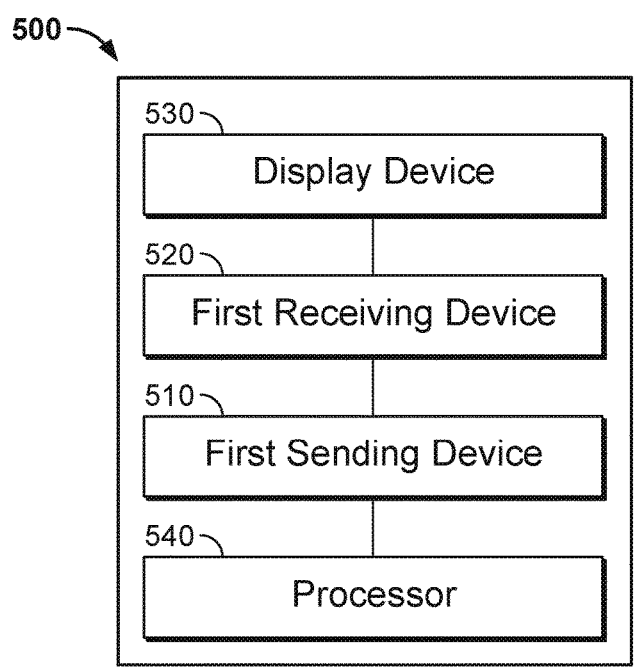
FIG. 5 is a structural diagram of an embodiment of a third party authorization terminal.

FIG. 5 is a structural diagram of an embodiment of a third party authorization terminal. In some embodiments, the third party authorization terminal 500 corresponds with the third party authorization terminal 430 of FIG. 4 and comprises: a first sending device 510, a first receiving device 520, a display device 530, and a processor 540.

In some embodiments, the first sending device 510 is configured to send an authorization information updating instruction to the request processing server. The authorization information updating instruction includes a data request terminal identifier of the data request terminal.

In some embodiments, the processor 540 is configured to update, based on the data request terminal identifier, the authorization information of the data request terminal stored on the request processing server to indicate that the data request terminal has authorization request processing authority.

The third party authorization terminal can establish a communication link with the data request terminal through an NFC component and thus quickly and conveniently acquire a data request terminal identifier from the data request terminal.

For example, the third party authorization terminal could be a mobile terminal including an NFC component, and the data request terminal could be a television terminal including an NFC component. The mobile terminal with an NFC component communicates in NFC P2P mode. For example, after making short-distance contact with the television terminal, the mobile terminal could acquire payment data request information and television terminal equipment information. The equipment information includes a data request terminal identifier.

The above scheme achieves the following: authorization by a third party authorization terminal in relation to authorization request processing authority by a data request terminal. Before the third party authorization terminal authorizes the data request terminal, the data request terminal has already accessed the request processing server. Therefore, the third party authorization terminal can have learned that the current authorization information of the data request terminal stored on the request processing server is that the data request terminal does not have authorization request processing authority. After the third party authorization terminal acquires a data request terminal identifier, the third party authorization terminal sends an authorization information updating request to a request processing server. Then, the request processing server looks up the current data request terminal authorization information that is already stored on the request processing server and updates this authorization information to indicate that the data request terminal has authorization request processing authority based on a data request terminal identifier included in the authorization information updating instruction. Thus, the next time the data request terminal accesses the request processing server, the request processing server does not need to use other equipment again, but can directly complete the payment process.

Thus, using a third party terminal which is a mobile terminal having an NFC component installed on and a data request terminal which is a television terminal having an NFC component as examples, an NFC component-based technical authorization payment method is provided, which, in combination with NFC and the mobile terminal, implements television authorized payment, with the result that television payment becomes more convenient and faster. Thus, multiple payments for a single authorization can be performed, and the satisfaction of user payment experience is increased.

In some embodiments, using as examples a third party authorization terminal which can be a mobile terminal, a data request terminal which is a payment terminal providing a payment function for locally generated order form information, and a request processing server which can be a payment server that generates transaction results upon completion of payment transactions, to increase the security of payment authorization, a payment count threshold value can be set. The payment server stores the number of times each payment terminal accesses the payment server to acquire payment authority. In other words, the payment server stores the number of payments made by the payment terminal. When the number of times that the payment terminal acquires payment authority (i.e., the number of times that payment is performed) within a preset period of time exceeds a payment count threshold value, the payment server automatically modifies the payment terminal's authorization information to indicate that the payment terminal does not have payment authority, and requires a third party to again perform payment authorization.

In some embodiments, the processor 540 is further configured to invoke an authorization page and write the data request terminal identifier of the data request terminal into the authorization page, and after the authorization page invoked by the third party authorization terminal receives the authorization information updating instruction, generate an authorization information updating instruction to be sent to the request processing server.

Using a third party authorization terminal which is a mobile terminal that has a field communication (NFC) device installed as an example, the mobile terminal can display data request information and the request payment authorization page.

Using the third party authorization terminal which is a mobile terminal that has an NFC component installed, an authorization control is set up on the authorization page of the mobile terminal. After the authorization control is clicked, the mobile terminal generates an authorization information updating instruction. At this point, the mobile terminal sends to the request processing server an authorization information updating instruction indicating that payment authorization is to be performed for the mobile terminal. The payment authorization indicates that the mobile terminal device has payment authority and in the future is to be able to conduct payments without requiring a password. After the payment authorization is successful, the television terminal sends a payment request to the request processing server to complete the payment process.

In some embodiments, the authorization request further includes a request serial number of the data request terminal.

In some embodiments, the first receiving device 520 is configured to receive the request serial number of the data request terminal in the authorization request provided by the data request terminal. In some embodiments, the first sending device 510 is further configured to send the request serial number of the data request terminal to the request processing server. The first receiving device 520 is further configured to receive the data request information sent back by the request processing server. In some embodiments, the request processing server looks up and obtains the data request information corresponding to the data request serial number based on the received request serial number, and the display device 530 is configured to display the data request information on the authorization page.

Figure 6:
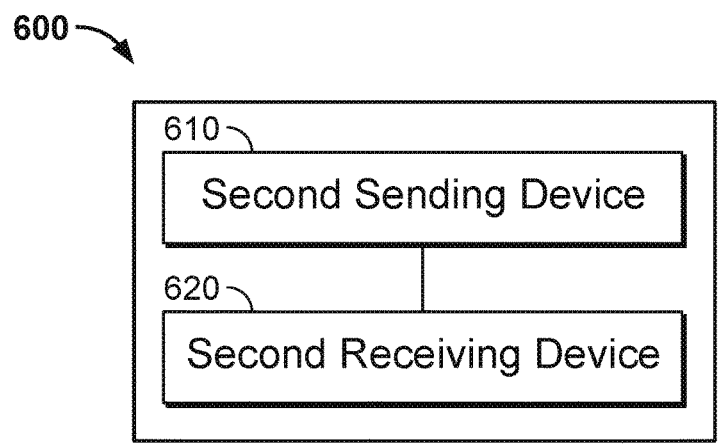
FIG. 6 is a structural diagram of an embodiment of a payment terminal.

FIG. 6 is a structural diagram of an embodiment of a payment terminal. In some embodiments, the payment terminal 600 corresponds to the payment terminal 410 of FIG. 4 and comprises a second sending device 610 and a second receiving device 620.

In some embodiments, the second sending device 610 is configured to send a payment request to the request processing server. The payment request includes the data request terminal identifier of the data request terminal. In some embodiments, the second receiving device 620 is configured to acquire authorization information generated by the request processing server based on the data request information. In some embodiments, after the request processing server looks up the authorization information matching the data request terminal identifier, the request processing server completes the data request processing based on the data request information of the data request terminal and generates a data request result.

Using as an example a third party authorization terminal which is a mobile terminal having an NFC component installed and a data request terminal that is a television terminal with an NFC component, the television terminal provides a payment radio-frequency field through the NFC component. In this example, the payment radio-frequency field includes outputting a payment request through the NFC component. To conserve resources, the payment result can merely include a request serial number. Other data request information can be acquired based on the request serial number to issue another request to the payment server.

Using as an example a third party authorization terminal which can be a mobile terminal, a data request terminal which is a payment terminal providing a payment function for locally generated order form information, and a request processing server which can be a payment server that generates transaction results upon completion of payment transactions, an authorization information-based payment process is provided. In some embodiments, payment authorization of the payment terminal is performed by a third party authorization terminal resulting in a convenient and fast payment process for the payment terminal. By relying on the multiple uses for a single authorization, the satisfaction of payment experiences of users can be increased.

Figure 7:
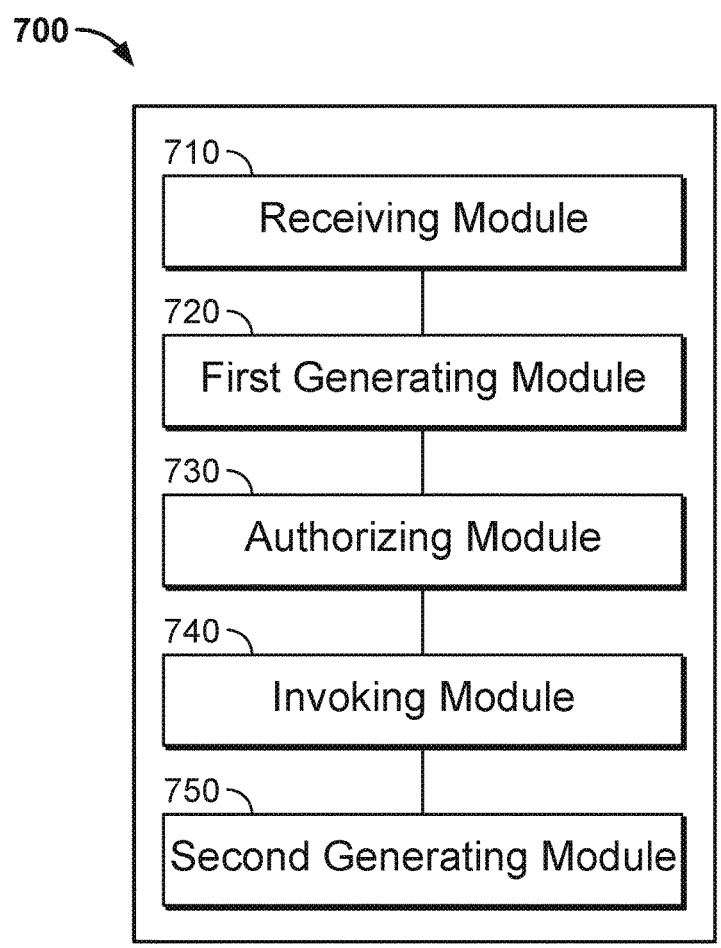
FIG. 7 is a structural diagram of an embodiment of a device for exchanging information.

FIG. 7 is a structural diagram of an embodiment of a device for exchanging information. In some embodiments, the device 700 is configured to implement the process 200 of FIG. 2A and comprises: a receiving module 710, a first generating module 720, and an authorizing module 730.

In some embodiments, the receiving module 710 is configured to receive the authorization request provided by the data request terminal. In some embodiments, the first generating module 720 is configured to generate an authorization information updating instruction. In some embodiments, the authorizing module 730 is configured to update, based on the updating instruction, the authorization information of the data request terminal that is stored on the request processing server to the data request terminal having authorization request processing authority, causing the data request terminal to acquire the data request result corresponding to the data request information.

In some embodiments, the authorization information updating instruction includes the data request terminal identifier of the data request terminal. Thus, the third party authorization terminal can update, based on the data request terminal identifier, the authorization information of the data request terminal stored on the request processing server, the authorization information of the data request terminal being updated to the data request terminal has authorization request processing authority.

As shown by the above scheme, a scheme for performing authorization request processing authority authorization for a data request terminal by a third party authorization terminal is provided. After the third party authorization terminal acquires a data request terminal identifier, the third party authorization terminal sends an authorization information updating request to a request processing server. Then, the request processing server looks up the current data request terminal authorization information that is already stored on the request processing server based on a data request terminal identifier included in the authorization information updating instruction and updates this authorization information to indicate that the data request terminal has authorization request processing authority. Thus, the next time the data request terminal accesses the request processing server, the request processing server does not need to use other equipment again, but can directly complete the payment process.

In some embodiments, the above scheme can be applied to a data request terminal that has not stored authorization information on a request processing server, or having stored authorization information lacking payment authority. Therefore, before the third party authorization terminal authorizes the data request terminal, the data request terminal already has accessed the request processing server, and failed to acquire authorization request processing authority. Therefore, the scheme can provide the data request terminal with authorization request processing authority through a third party authorization terminal. For example, the third party authorization terminal can access a request processing server, and the stored current authorization information of the data request terminal is to indicate that the data request terminal has authorization request processing authority.

Thus, the following are achieved: by providing the data request terminal with a request processing server for completing the payment process, the data request terminal only is to send a data request to the request processing server. The request processing server then is to acquire the data request result based on the data request information generated from the order information in the data request and the authorization information of the data request terminal. The authorization information is used to indicate whether the data request terminal has authorization request processing authority. Once the content of the authorization information record indicates that the data request terminal has authorization request processing authority, the data request terminal can acquire the data request result corresponding to the data request information based on the authorization information; if the authorization information record content indicates that the data request terminal does not have the authorization request processing authority, the authorization information of the data request terminal can be updated via the third party authorization terminal to indicate that the data request terminal has authorization request processing authority, causing the data request terminal to acquire the data request result corresponding to the data request information.

Please note that using as an example a third party authorization terminal which can be a mobile terminal, a data request terminal which is a payment terminal providing a payment function for locally generated order form information, and a request processing server which can be a payment server that generates transaction results upon completion of payment transactions, the above payment process does not require the user to additionally perform operator registration or to input his or her bank card number, name, identification card number, or payment code or to perform other such operations at the payment terminal. Nor does the above payment process require the user to perform an operation such as scanning a QR code. The above payment process therefore streamlines the user's operating process and reduces operating costs. The above payment process also reduces the complexity of the process whereby Internet providers provide data processing requests and thus provides a more convenient and secure operating experience to payment terminal users. Furthermore, when no payment authority at the payment terminal exists, the system completes payment authorization through third party equipment. Thus, the next time the payment terminal accesses the payment server, the payment terminal does not need to use other equipment again, but can directly complete the payment process.

Please note that the receiving module 710, the first generating module 720, and the authorizing module 730 perform operations 210-230 of FIG. 2A.

In some embodiments, the first generating module 720 is configured to send an authorization information updating instruction to the request processing server. The authorization information updating instruction includes the data request terminal identifier of the data request terminal. The authorizing module 730 is further configured to update, based on the data request terminal identifier, the authorization information of the data request terminal stored on the request processing server to indicate that the data request terminal has authorization request processing authority.

In some embodiments, the device further includes: an invoking module 740 and a second generating module 750.

In some embodiments, the invoking module 740 is configured to invoke an authorization page and write the data request terminal identifier of the data request terminal into the authorization page. After the invoked authorization page receives the authorization information updating instruction, the second generating module 750 is configured to generate the authorization information updating instruction that is sent to the request processing server.

In some embodiments, a storage medium can be located in a television terminal in a group of television terminals in a computer network.

In some embodiments, the storage medium is set up to store program code used to perform the following: activate a third party authorization terminal to receive an authorization request provided by a data request terminal; the third party authorization terminal sends an authorization information updating instruction to a request processing server based on the authorization request; the third party authorization terminal updates, based on the updating instruction, the authorization information of the data request terminal that is stored on the request processing server, the authorization information of the data request terminal being updated to the data request terminal has authorization request processing authority, causing the data request terminal to acquire the data request result corresponding to the data request information.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Figure 8:
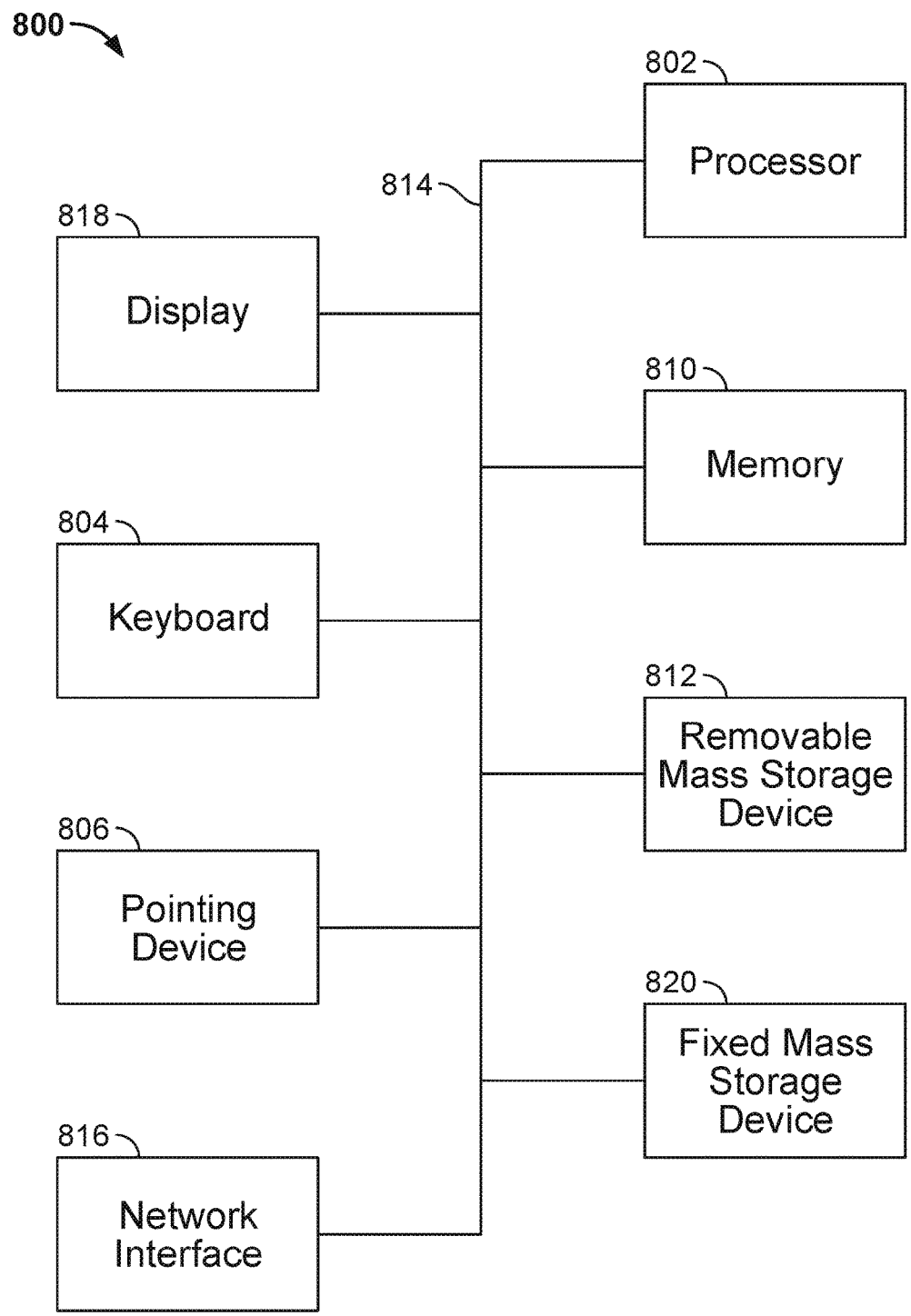
FIG. 8 is a functional diagram illustrating an embodiment of a programmed computer system for exchanging information.

FIG. 8 is a functional diagram illustrating an embodiment of a programmed computer system for exchanging information. As will be apparent, other computer system architectures and configurations can be used to exchange information. Computer system 800, which includes various subsystems as described below, includes at least one microprocessor subsystem (also referred to as a processor or a central processing unit (CPU)) 802. For example, processor 802 can be implemented by a single-chip processor or by multiple processors. In some embodiments, processor 802 is a general purpose digital processor that controls the operation of the computer system 800. Using instructions retrieved from memory 810, the processor 802 controls the reception and manipulation of input data, and the output and display of data on output devices (e.g., display 818).

Processor 802 is coupled bi-directionally with memory 810, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 802. Also as is well known in the art, primary storage typically includes basic operating instructions, program code, data and objects used by the processor 802 to perform its functions (e.g., programmed instructions). For example, memory 810 can include any suitable computer-readable storage media, described below, depending on whether, for example, data access needs to be bi-directional or uni-directional. For example, processor 802 can also directly and very rapidly retrieve and store frequently needed data in a cache memory (not shown).

A removable mass storage device 812 provides additional data storage capacity for the computer system 800, and is coupled either bi-directionally (read/write) or uni-directionally (read only) to processor 802. For example, storage 812 can also include computer-readable media such as magnetic tape, flash memory, PC-CARDS, portable mass storage devices, holographic storage devices, and other storage devices. A fixed mass storage 820 can also, for example, provide additional data storage capacity. The most common example of mass storage 820 is a hard disk drive. Mass storages 812, 820 generally store additional programming instructions, data, and the like that typically are not in active use by the processor 802. It will be appreciated that the information retained within mass storages 812 and 820 can be incorporated, if needed, in standard fashion as part of memory 810 (e.g., RAM) as virtual memory.

In addition to providing processor 802 access to storage subsystems, bus 814 can also be used to provide access to other subsystems and devices. As shown, these can include a display monitor 818, a network interface 816, a keyboard 804, and a pointing device 806, as well as an auxiliary input/output device interface, a sound card, speakers, and other subsystems as needed. For example, the pointing device 806 can be a mouse, stylus, track ball, or tablet, and is useful for interacting with a graphical user interface.

The network interface 816 allows processor 802 to be coupled to another computer, computer network, or telecommunications network using a network connection as shown. For example, through the network interface 816, the processor 802 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 802 can be used to connect the computer system 800 to an external network and transfer data according to standard protocols. For example, various process embodiments disclosed herein can be executed on processor 802, or can be performed across a network such as the Internet, intranet networks, or local area networks, in conjunction with a remote processor that shares a portion of the processing. Additional mass storage devices (not shown) can also be connected to processor 802 through network interface 816.

An auxiliary I/O device interface (not shown) can be used in conjunction with computer system 800. The auxiliary I/O device interface can include general and customized interfaces that allow the processor 802 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 8 is but an example of a computer system suitable for use with the various embodiments disclosed herein. Other computer systems suitable for such use can include additional or fewer subsystems. In addition, bus 814 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
  receiving an authorization request provided by a data request terminal;
  generating an authorization information updating instruction based on the authorization request, comprising:
    invoking an authorization page, comprising:
      obtaining data request information based on a request identifier, wherein the request identifier is extracted from the authorization request provided by the data request terminal; and
      writing a data request terminal identifier of the data request terminal into the authorization page;
    generating and sending the authorization information updating instruction to a request processing server;
  updating, based on the authorization information updating instruction, authorization information of the data request terminal that is stored on a storage accessible by the request processing server, the authorization information indicating that the data request terminal has authorization request processing authority, wherein before the updating of the authorization information, the authorization information indicating that the data request terminal does not have authorization request processing authority; and
  causing the data request terminal to acquire a data request result corresponding to data request information.

2. The method as described in claim 1, prior to the receiving of the authorization request provided by the data request terminal, further comprising:
  sending, by the data request terminal, a data request to the request processing server;
  acquiring, by the data request terminal, the data request information generated by the request processing server based on customized information in the data request and the authorization information of the data request terminal;
  in response to a determination that the authorization information indicates that the data request terminal has authorization request processing authority, acquiring, by the data request terminal, the data request result corresponding to the data request information based on the authorization information; and
  in response to a determination that the authorization information indicates that the data request terminal does not have authorization request processing authority, sending, by the data request terminal, the authorization request provided by the data request terminal.

3. The method as described in claim 2, wherein:
  the authorization information updating instruction includes the data request terminal identifier for the data request terminal; and
  the updating of the authorization information of the data request terminal that is stored on a storage accessible by the request processing server comprises:
    locating a data request terminal that matches the data request terminal identifier;
    fetching the authorization information already stored by the data request terminal; and
    updating the authorization information already stored by the data request terminal to indicate that the data request terminal has the authorization request processing authority.

4. The method as described in claim 3, wherein:
  the updating of the authorization information of the data request terminal that is stored on the storage accessible by the request processing server comprises:
    updating, based on the data request terminal identifier, the authorization information of the data request terminal stored on the storage accessible by the request processing server, the authorization information being updated to indicate that the data request terminal has the authorization request processing authority.

5. The method as described in claim 3, wherein:
  the acquiring of the data request result corresponding to the data request information comprises:
    sending, by the data request terminal, a payment request to the request processing server, the payment request including the data request terminal identifier of the data request terminal; and
    receiving, by the data request terminal, the data request result generated by the request processing server based on the data request information, wherein: after the request processing server looks up the authorization information matched with the data request terminal identifier:
completing, by the request processing server, data request processing based on the data request information of the data request terminal; and
generating, by the request processing server, the data request result.

6. The method of claim 1, wherein the authorization request is sent by the data request terminal via a Near-Field Communication (NFC) channel.

7. The method of claim 1, wherein the authorization request is received by a mobile device comprising an NFC component.

8. The method of claim 1, wherein the data request terminal sending the authorization request is a television terminal.

9. A processing system, comprising:
a request processing server;
a data request terminal, comprising:
 at least one processor configured to:
  provide authorization requests; and
 a memory coupled to the at least one processor and configured to provide the at least one processor with instructions; and
a third party authorization terminal, comprising:
 at least one processor configured to:
  receive an authorization request provided by a data request terminal;
  generate an authorization information updating instruction based on the authorization request, comprising to:
   invoke an authorization page, comprising to:
    obtain data request information based on a request identifier, wherein the request identifier is extracted from the authorization request provided by the data request terminal; and
    write a data request terminal identifier of the data request terminal into the authorization page;
   generate and send the authorization information updating instruction to a request processing server;
   update, based on the authorization information updating instruction, authorization information of the data request terminal that is stored on a storage accessible by the request processing server, the authorization information indicating that the data request terminal has authorization request processing authority, wherein before the updating of the authorization information, the authorization information indicating that the data request terminal does not have authorization request processing authority; and
   cause the data request terminal to acquire a data request result corresponding to data request information; and
 a memory coupled to the at least one processor and configured to provide the at least one processor with instructions.

10. The system as described in claim 9, wherein the at least one processor of the data request terminal is further configured to:
prior to the receiving of the authorization request provided by the data request terminal:
 send a data request to the request processing server;
 acquire the data request information generated by the request processing server based on customized information in the data request and the authorization information of the data request terminal;
in response to a determination that the authorization information indicates that the data request terminal has authorization request processing authority, acquire the data request result corresponding to the data request information based on the authorization information; and
in response to a determination that the authorization information indicates that the data request terminal does not have authorization request processing authority, send the authorization request provided by the data request terminal.

11. The system as described in claim 10, wherein:
the authorization information updating instruction including the data request terminal identifier of the data request terminal; and
the updating of the authorization information of the data request terminal that is stored on the storage accessible by the request processing server comprises to:
 update, based on the data request terminal identifier, the authorization information of the data request terminal stored on the storage accessible by the request processing server, the authorization information being updated to indicate that the data request terminal has the authorization request processing authority.

12. The system as described in claim 11, wherein:
the at least one processor of the data request terminal is further configured to:
 send a payment request to a data processing server, the payment request including the data request terminal identifier of the data request terminal; and
 receive the data request result generated by the request processing server based on the data request information; and
the at least one processor of the request processing server is further configured to:
 after the looking up of the authorization information matched with the data request terminal identifier:
  complete data request processing based on the data request information of the data request terminal; and
  generate the data request result.

13. A device, comprising:
at least one processor configured to:
 receive an authorization request provided by a data request terminal;
 generate an authorization information updating instruction based on the authorization request, comprising to:
  invoke an authorization page, comprising to:
   obtain data request information based on a request identifier,
   wherein the request identifier is extracted from the authorization request provided by the data request terminal; and
   write a data request terminal identifier of the data request terminal into the authorization page;
 generate and send the authorization information updating instruction to a request processing server;
 update, based on the authorization information updating instruction, authorization information of the data request terminal that is stored on a storage accessible by the request processing server, the authorization information indicating that the data request terminal has authorization request processing authority, wherein before the updating of the authorization information, the authorization information indicating that the data request terminal does not have authorization request processing authority; and cause the data request terminal to acquire a data request result corresponding to data request information; and a memory coupled to the at least one processor and configured to provide the at least one processor with instructions.

14. The device as described in claim 13, wherein:

the authorization information updating instruction including the data request terminal identifier of the data request terminal; and the updating of the authorization information of the data request terminal that is stored on the storage accessible by the request processing server comprises to:

update, based on the data request terminal identifier, the authorization information of the data request terminal stored on the storage accessible by the request processing server, the authorization information being updated to indicate that the data request terminal has the authorization request processing authority.

\* \* \* \* \*